United States Patent [19]

Hua

[11] Patent Number: 5,487,442
[45] Date of Patent: Jan. 30, 1996

[54] TRANSMISSION APPARATUS OF A ELECTRICAL BICYCLE

[76] Inventor: Jung-Lin Hua, 11th Fl., No. 1, Lane 1, Kuo Feng St., Tso Ying Dist., Kaohsiung City, Taiwan

[21] Appl. No.: 318,131

[22] Filed: Oct. 5, 1994

[51] Int. Cl.[6] ................................................ B62K 11/10
[52] U.S. Cl. ........................................ 180/220; 280/288.4
[58] Field of Search ................................ 180/205, 206, 180/207, 220, 65.1; 280/288.4, 202

[56] References Cited

U.S. PATENT DOCUMENTS 5,368,122  11/1994  Chou ........................................ 180/220

FOREIGN PATENT DOCUMENTS

| 3213043 | 10/1983 | Germany | 180/220 |
| 3200498 | 9/1991 | Japan | 180/220 |
| 9317904 | 9/1993 | WIPO | 180/220 |

*Primary Examiner*—Margaret A. Focarino
*Assistant Examiner*—Victor E. Johnson

*Attorney, Agent, or Firm*—Hedman, Gibson & Costigan

[57] ABSTRACT

A transmission apparatus is used in an electrical bicycle which includes a power switch, a rear wheel and a hub in the rear wheel. The transmission apparatus of the electrical bicycle includes an upper transmission set including a speed-reducing motor connected to a drive gear which is meshed to a driven gear, a middle transmission set including an upper rod, a lower rod, and a universal joint connected therebetween, where the upper rod is connected to the driven gear, and a lower transmission set including a first bevel gear extended from the lower rod, a second bevel gear meshing with the first bevel gear, a tube extended from the second bevel gear and received in the hub of the rear wheel, and at least one unidirectional needle bearing positioned between the hub and the extended tube allowing the extended tube to drive the hub to rotate thus moving the rear wheel forward yet not allowing the hub to drive the extended tube to rotate. When the power switch is turned on, the speed-reducing motor is energized to rotate, thus driving the rear wheel to move forward via transmission through the drive gear, the driven gear, the upper rod, the universal joint, the lower rod, the first bevel gear, the second bevel gear, the extended tube, the unidirectional bearing, and the hub.

3 Claims, 8 Drawing Sheets

TRANSMISSION APPARATUS OF A ELECTRICAL BICYCLE

BACKGROUND OF THE INVENTION

1. Field of the Invention

The present invention relates to a transmission apparatus of an electrical bicycle.

2. Description of the Prior Art

Electrical bicycles have been provided for years, and most of them have a driving device installed on the pedals for driving the rear wheel to rotate via a chain. However, the chain may slide during transmission, therefore improvement is needed on the conventional transmission of an electrical bicycle. In another point, the electrical bicycle has two driving modes including a pedaling driving mode and an electrical driving mode. In some situations, a user may want to operate the bicycle in the pedaling driving mode for exercise purpose. However, the electrical driving device and the electrical transmission device have a considerable weight thus when the user is pedaling, the weight from the electrical driving device will be a considerable burden for the user.

The present invention has arisen to mitigate and/or obviate the afore-described disadvantages of the conventional transmission apparatus of an electrical bicycle.

SUMMARY OF THE INVENTION

The primary objective of the present invention is to provide an improved transmission apparatus of an electrical bicycle allowed to be installed vertically along an extension line by a carrier board and a shaft of a rear wheel of the bicycle.

Another objective of the present invention is to provide an improved transmission apparatus of an electrical bicycle, where a portion of the transmission apparatus is easily detachable from the bicycle to reduce weight when a user wants to pedal the bicycle.

In accordance with one aspect of the invention, there is provided a transmission apparatus of an electrical bicycle which includes a power switch, a rear wheel and a hub in the rear wheel. The transmission apparatus includes an upper transmission set including a speed-reducing motor connected to a drive gear which is meshed to a driven gear, a middle transmission set including an upper rod, a lower rod, and a universal joint connected therebetween, where the upper rod is connected to the driven gear, and a lower transmission set including a first bevel gear extended from the lower rod, a second bevel gear meshing with the first bevel gear, a tube extended from the second bevel gear and received in the hub of the rear wheel, and at least one unidirectional needle bearing positioned between the hub and the extended tube allowing the extended tube to drive the hub to rotate thus moving the rear wheel forward yet not allowing the hub to drive the extended tube to rotate. When the power switch is turned on, the speed-reducing motor is energized to rotate, thus driving the rear wheel to move forward via transmission through the drive gear, the driven gear, the upper rod, the universal joint, the lower rod, the first bevel gear, the second bevel gear, the extended tube, the unidirectional bearing, and the hub, while when the power switch is turned off and the electrical bicycle is physically pedaled, the hub rotates to drive the rear wheel to move forward yet not drive the transmission apparatus due to the function of the unidirectional needle type bearing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
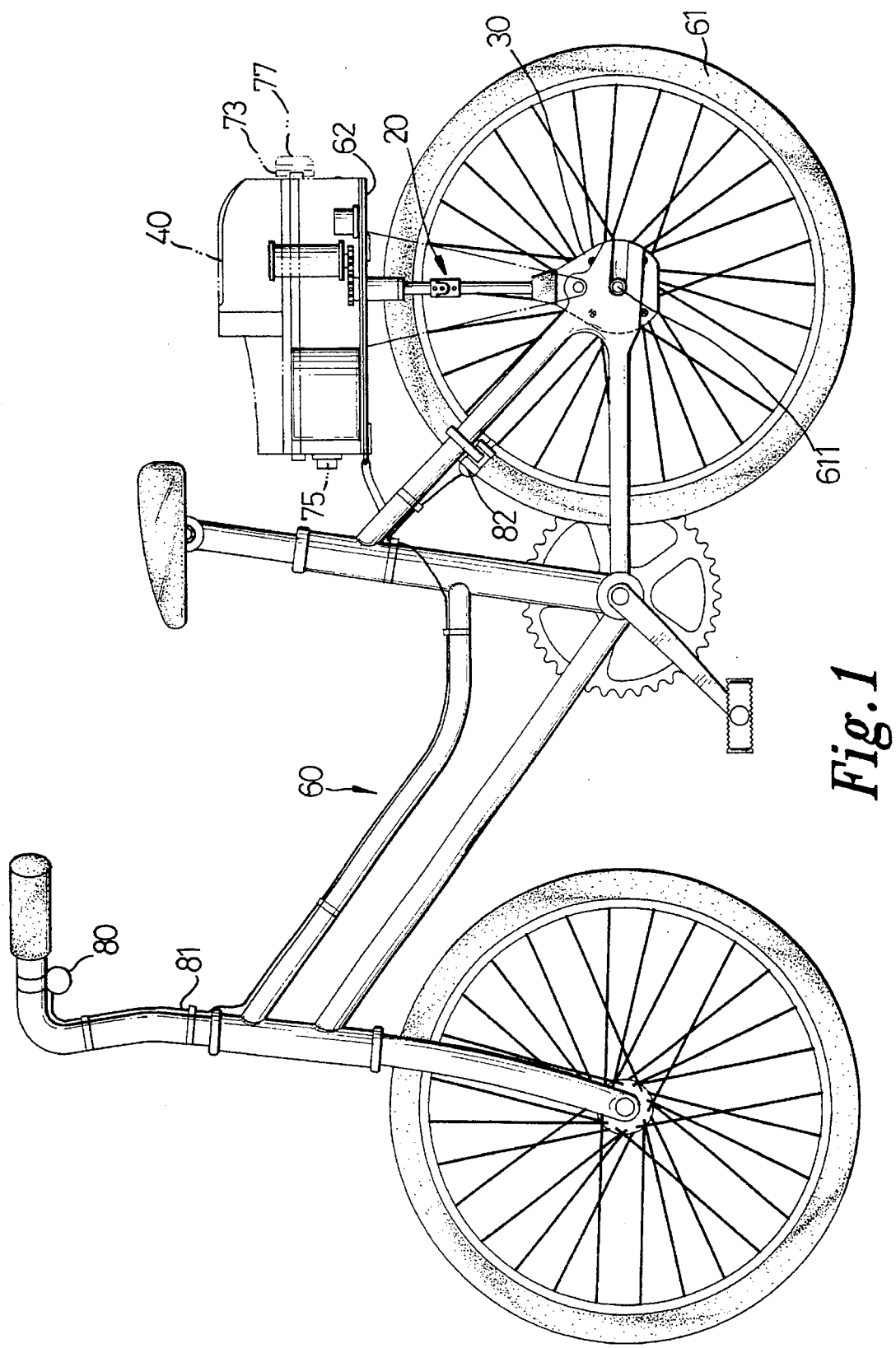
FIG. 1 illustrates an electrical bicycle, where an improved transmission apparatus is installed thereon.
Figure 10:
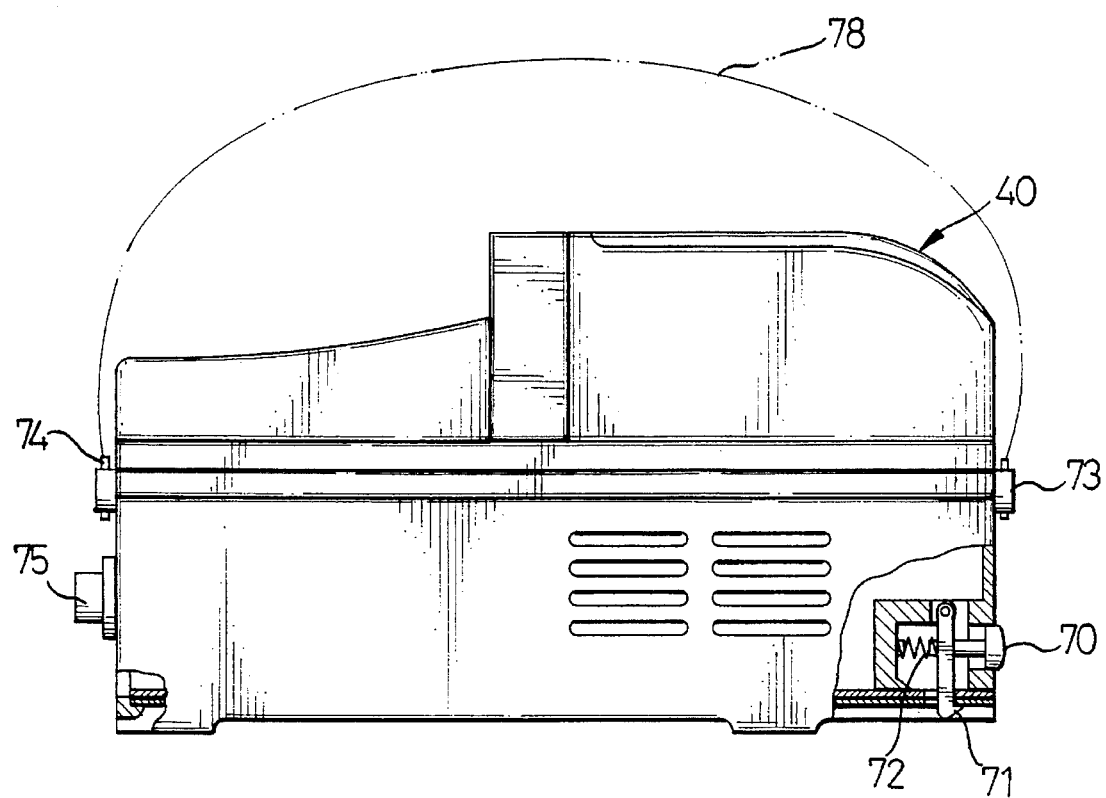
FIG. 10 is a partially cross-sectional view of the generator box for illustrating the engagement between the generator box and the carrier board.

Referring to FIG. 1, an electrical bicycle 60 is illustrated schematically. The electrical bicycle 60 includes a power switch 80 connected to a plug 82 via a wire 81. A generator box 40 is installed on a carrier board 62 of the bicycle 60. The generator box 40 has a socket 75 installed thereon associated with the plug 82. When a user inserts the plug 82 into the socket 75 and turns on the power switch 80, the electrical bicycle is activated and functions in an automatic driving mode. A reflector 77 is installed on the box 40 for reflecting light at night. A transmission apparatus in accordance with the present invention is vertically installed with respect to a shaft 611 of a rear wheel 61 of the bicycle 60. Also referring to FIGS. 2 and 3, the transmission apparatus comprises an upper transmission set 50 positioned in the generator box 40, a lower transmission set 31 positioned in a box 30 which is attached to the shaft 611 of the rear wheel 61, a middle transmission set 20 vertically connected between the upper transmission set 50 and the lower transmission set 31. The upper transmission set 50 comprises a speed-reducing motor 51 connected to a drive gear 52 which is in mesh with a driven gear 53. A hexagonal shaft 54 is extended from the drive gear 53. A relay 55 is electrically connected to the speed-reducing motor 51 for activating the latter to rotate when the relay 55 is energized by electrical power from a battery 42 in the generator box 40. It should be noted that when the plug 82 is inserted into the socket 75 and the power switch 80 is turned on, the relay 55 is energized and the speed-reducing motor 51 rotates in response to the energization of the relay 55. The electrical circuit between the power switch 80, the battery 42, the relay 55, and the speed-reducing motor 51 is conventional and well known, therefore it is omitted herein. Also referring to FIGS. 4 and 10, the generator box 40 is engaged to the carrier board 62 by a hook 71 and a biasing spring 72. A button 70 is operable to release the engagement of the hook 71 on the carrier board 62. Two rings 73 and 74 are formed on opposite sides of the generator box 40 allowing a belt 72 to be fixed thereon. A user can carry the generator box 40 by the belt 78 when the box 40 is released from the carrier board 62.

Figure 2:
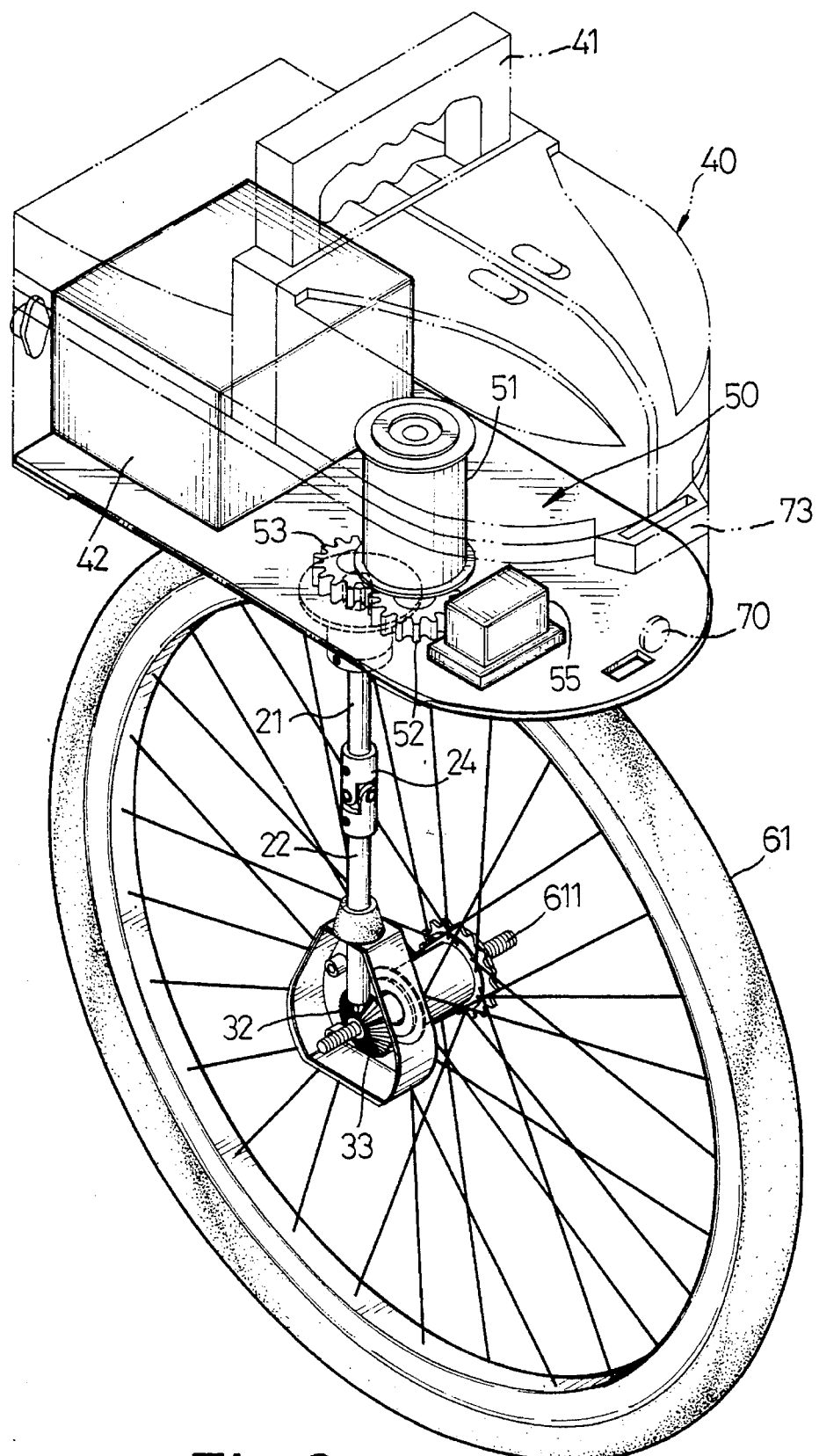
FIG. 2 is an enlarged view of the transmission apparatus of FIG. 1 for illustrative purpose.
Figure 3:
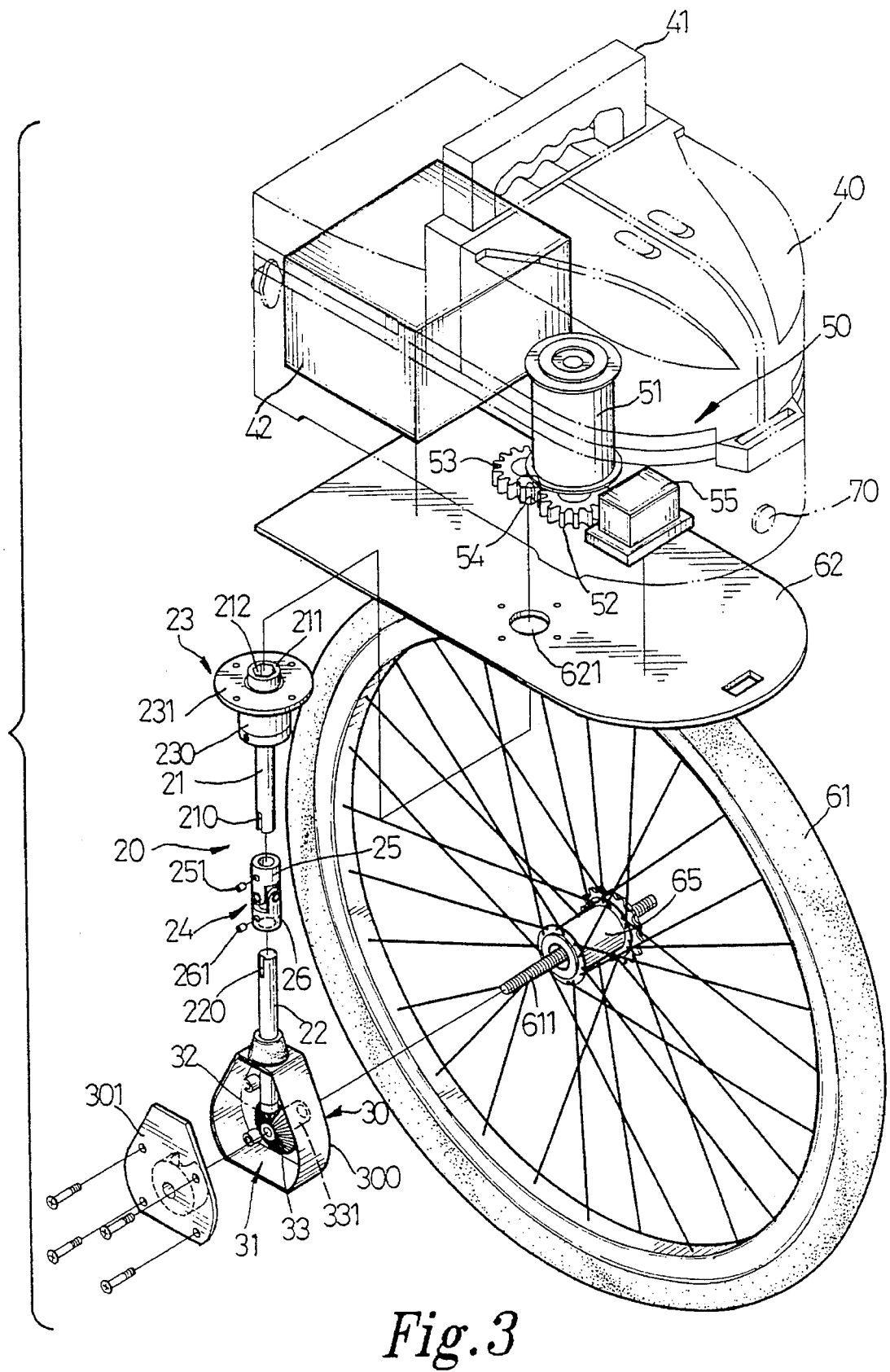
FIG. 3 is a partially exploded view of FIG. 2.
Figure 4:
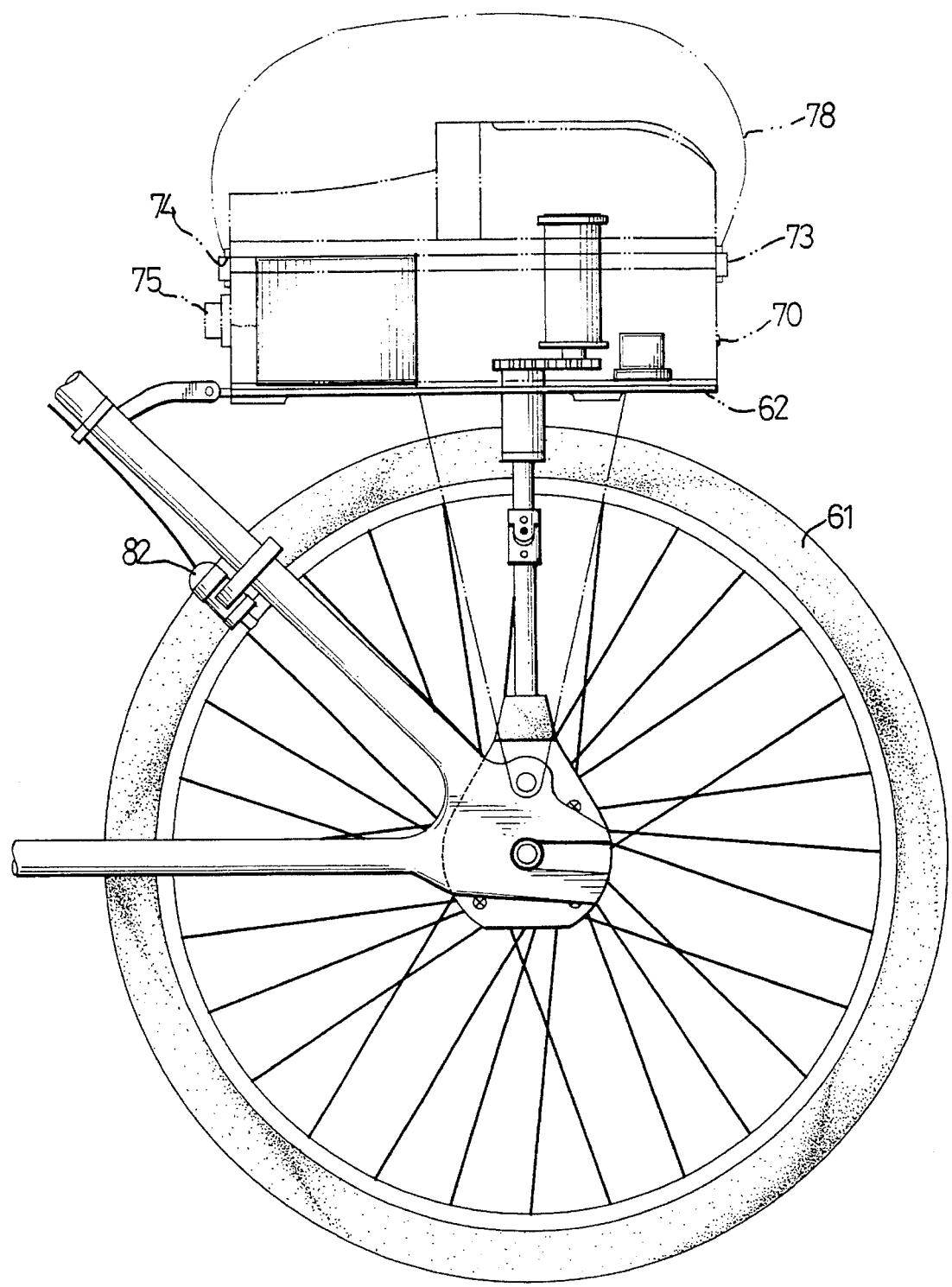
FIG. 4 illustrates a generator box is installed on a carrier board of the electrical bicycle.

Further referring to FIGS. 2 and 3, the middle transmission set 20 comprises an upper rod 21, a lower rod 22, and a universal joint 24 connected therebetween. The upper rod 21 has an upper end thereof connected to a positioning socket 23 via a bearing (not labeled) of the positioning socket 23. The positioning socket 23 comprises a cylinder 230 connected to a disk 231. The bearing (not labeled) for receiving the upper end of the upper rod 21 is partially received in the cylinder 230 of the positioning socket 23. A tubular head 211 integrally formed with the upper rod 21 and extends out of the disk 231. A hexagonal hole 212 is defined in the tubular head 211 for receiving the hexagonal shaft 54 of the driven gear 53. The carrier board 62 defines a hole 621 allowing the tubular head 211 to pass therethrough. A plurality of holes (not labeled) are defined in the disk 231 of the positioning socket 23 substantially around the tubular head 211 and a plurality of corresponding holes (not labeled) are defined in the carrier board 62 allowing screws (not shown) to fix the positioning socket 23 onto a bottom surface of the carrier board 62. The upper rod 21 defines a groove 210 in a lower periphery portion thereof. The lower rod 22 defines a groove 220 in an upper periphery portion thereof. The universal joint 24 comprises an upper yoke 25, a lower yoke 26, and a cross (not shown) pivotally connected between the upper yoke 25 and the lower yoke 26. Since the universal joint 24 is conventional and well known, therefore the detail thereof is omitted herein. The upper yoke 25 and the lower yoke 26 are substantially identical and each respectively includes a tube (not included) extended with two prongs (not labeled). A lower end of the upper rod 21 is received in the tube portion of the upper yoke 25 and an upper end of the lower rod 22 is received in the tube portion of the lower yoke 26. The upper yoke 25 and the lower yoke 26 each respectively define a hole (not labeled). Two pins 251 and 261 each respectively secure the upper rod 21 in the upper yoke 25 and the lower rod 22 in the lower yoke 26. A lower portion of the lower rod 22 is rotatably received in the box 30 which includes a casing 300 detachably attached to a cover 301.

Figure 5:
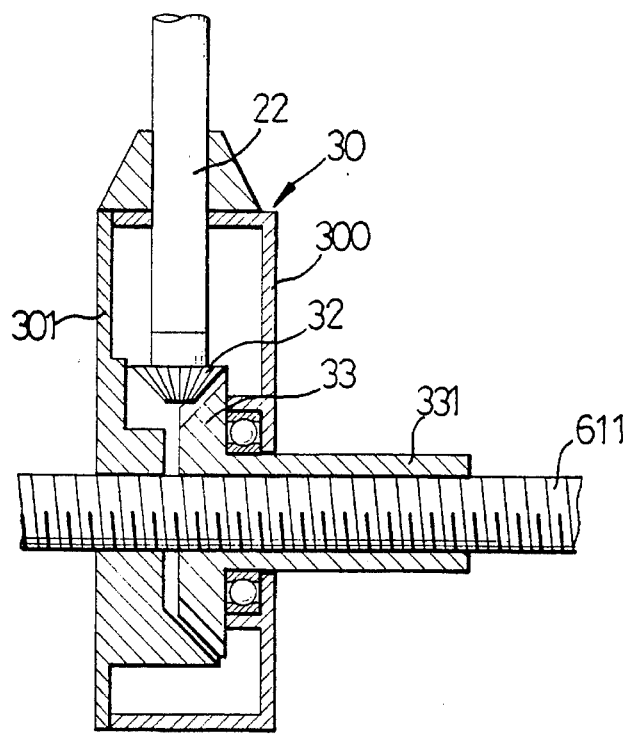
FIG. 5 is a cross-sectional view of a lower transmission set of the transmission apparatus in accordance with the present invention.
Figure 6:
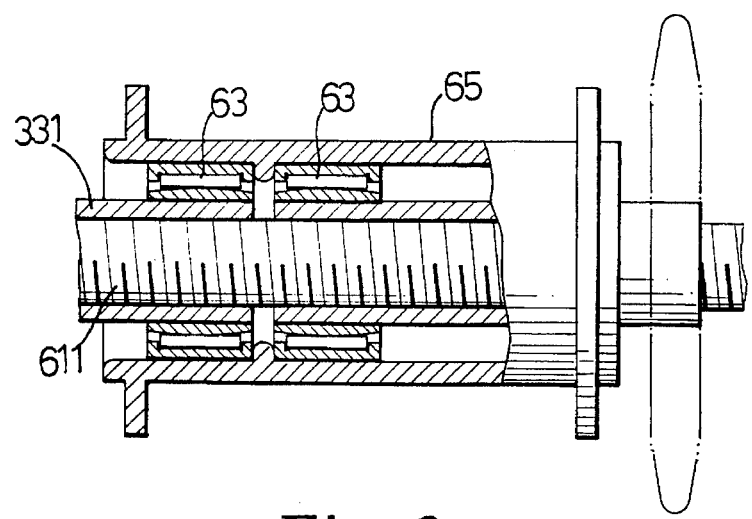
FIG. 6 illustrates two unidirectional needle type bearings in a hub of a rear wheel of the electrical bicycle.
Figure 7:
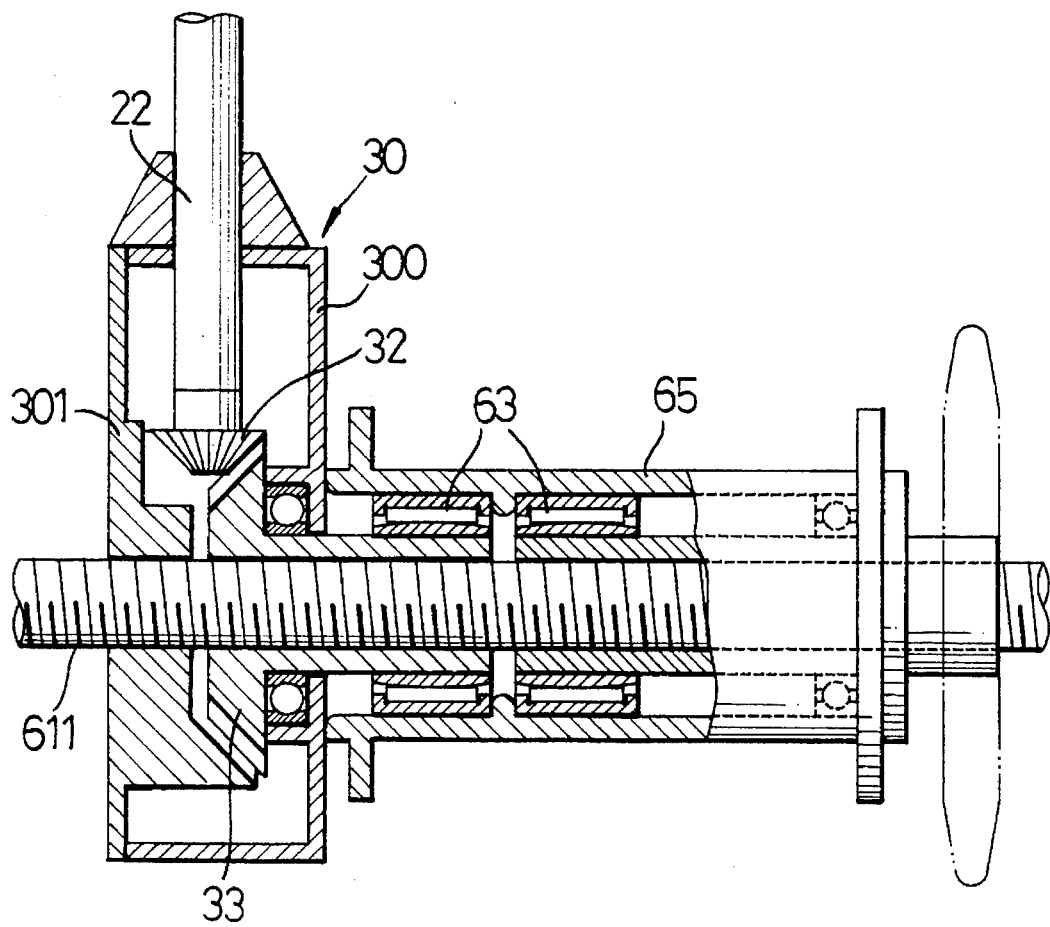
FIG. 7 is an assembled view of FIGS. 5 and 6.

Also referring to FIG. 5, a bevel gear 33 integrally formed with a tube 331 is rotatably retained in the casing 300 with the tube 331 extending through out of a hole (not labeled) of the casing 300. The lower rod 22 has a bevel gear head 32 meshing with the bevel gear 33. The shaft 611 of the rear wheel 61 passes through the extended tube 331 and has a portion thereof rotatably received in the extended tube 331. Also referring to FIG. 6, the extended tube 331 has a portion received in the hub 65 of the rear wheel 61 (see FIG. 3) of the bicycle 60. It should be noted that the size of each of the parts in FIG. 6 is slightly enlarged compared to that in FIG. 5 for illustrative purpose only. Two unidirection needle type bearings 63 are positioned between the received portion of the extended tube 331 and the hub 65 allowing the extended tube 331 to drive the hub 65 to rotate thereby driving the rear wheel 61 to move forward. It should be noted that the unidirectional needle type bearings 63 do not allow the hub 65 to drive the extended tube 331 to rotate, i.e., when the hub 65 rotates due to a pedaling from the user, the bearings 65 function to prevent the extended tube 331 from rotation. FIG. 7 illustrates an assembly of FIGS. 5 and 6 for easy understanding of a transmission between the lower rod 22, the bevel gear head 32, the driven bevel gear 33, the extended tube 331, the bearings 63, and the hub 65.

Referring to FIGS. 1, 2, and 3, when the power switch 80 is turned on, the speed-reducing motor 51 is energized to rotate, thus driving the rear wheel 61 to move forward via transmission through the drive gear 52, the driven gear 53, the upper rod 21, the universal joint 24, the lower rod 22, the bevel gear head 32, the driven bevel gear 33, the extended tube 331, the unidirectional bearing 63, and the hub 65, while when the power switch 80 is turned off and the electrical bicycle 60 is physically pedaled, the hub 65 rotates to drive the rear wheel 61 to move forward yet not drive the transmission apparatus of the present invention because of the function of the unidirectional needle type bearings 65.

Figure 8:
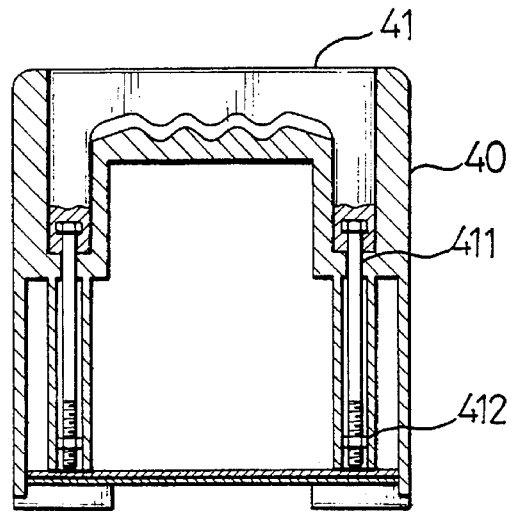
FIG. 8 is a cross-sectional view of the generator box illustrating a handle of the generator box is in a retracted status.
Figure 9:
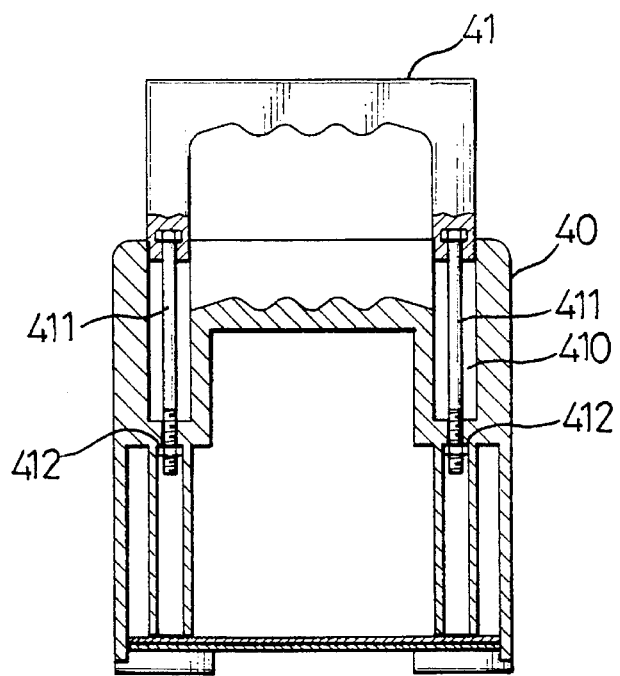
FIG. 9 is a cross-sectional view of the generator box illustrating a handle of the generator box is in an extended status.

Referring to FIG. 8, a handle 41 is telescopically received in the box 40. Also referring to FIG. 9, the box 40 includes two channels 410 therein each to telescopically receive a corresponding bolt 411 and a nut 412 connected to near one end of the bolt 411. Each of the channels 410 has a narrow portion substantially at a middle portion thereof. The handle 41 has a lower lateral portion thereof formed with waves for easing a user to lift it upward from a retracted status of FIG. 8 to an extended status of FIG. 9.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A transmission apparatus of an electrical bicycle which includes a battery, a power switch, a carrier board, a rear wheel, and a hub of the rear wheel, comprising an upper transmission set including a speed-reducing motor connected to a drive gear which is meshed to a driven gear which has a hexagonal shaft extending downward therefrom;

a middle transmission set comprising an upper rod, a lower rod, and a universal joint connected therebetween, the upper rod at a top thereof including a tubular head which defines a hexagonal hole for receiving the hexagonal shaft thus connecting the upper rod to the driven gear;

a lower transmission set comprising a first bevel gear extended from the lowered rod, a second bevel gear meshing with the first bevel gear, a tube extended from the second bevel gear and received in the hub of the rear wheel, at least one unidirectional needle bearing positioned between the hub and the extended tube allowing the extended tube to drive the hub to rotate thus moving the rear wheel forward yet not allowing the hub to drive the extended tube to rotate;

whereby when the power switch is turned on, the speed-reducing motor is energized to rotate, thus driving the rear wheel to move forward via transmission through the drive gear, the driven gear, the upper rod, the universal joint, the lower rod, the first bevel gear, the second bevel gear, the extended tube, the unidirectional bearing, and the hub, while when the power switch is turned off and the electrical bicycle is physically pedaled, the hub rotates to drive the rear wheel to move forward yet not drive the transmission apparatus.

2. A transmission apparatus as claimed in claim 1, wherein the upper transmission set is received in a box which is detachably mounted on the carrier board of the bicycle.

3. A transmission apparatus as claimed in claim 1 further comprising a positioning socket rotatably retaining a portion of the tubular head and being attached on a lower surface of the carrier board of the bicycle.

* * * * *